May 25, 1937.  C. DAUM  2,081,424
FRUIT JUICE EXTRACTOR
Filed Oct. 27, 1933  2 Sheets-Sheet 1
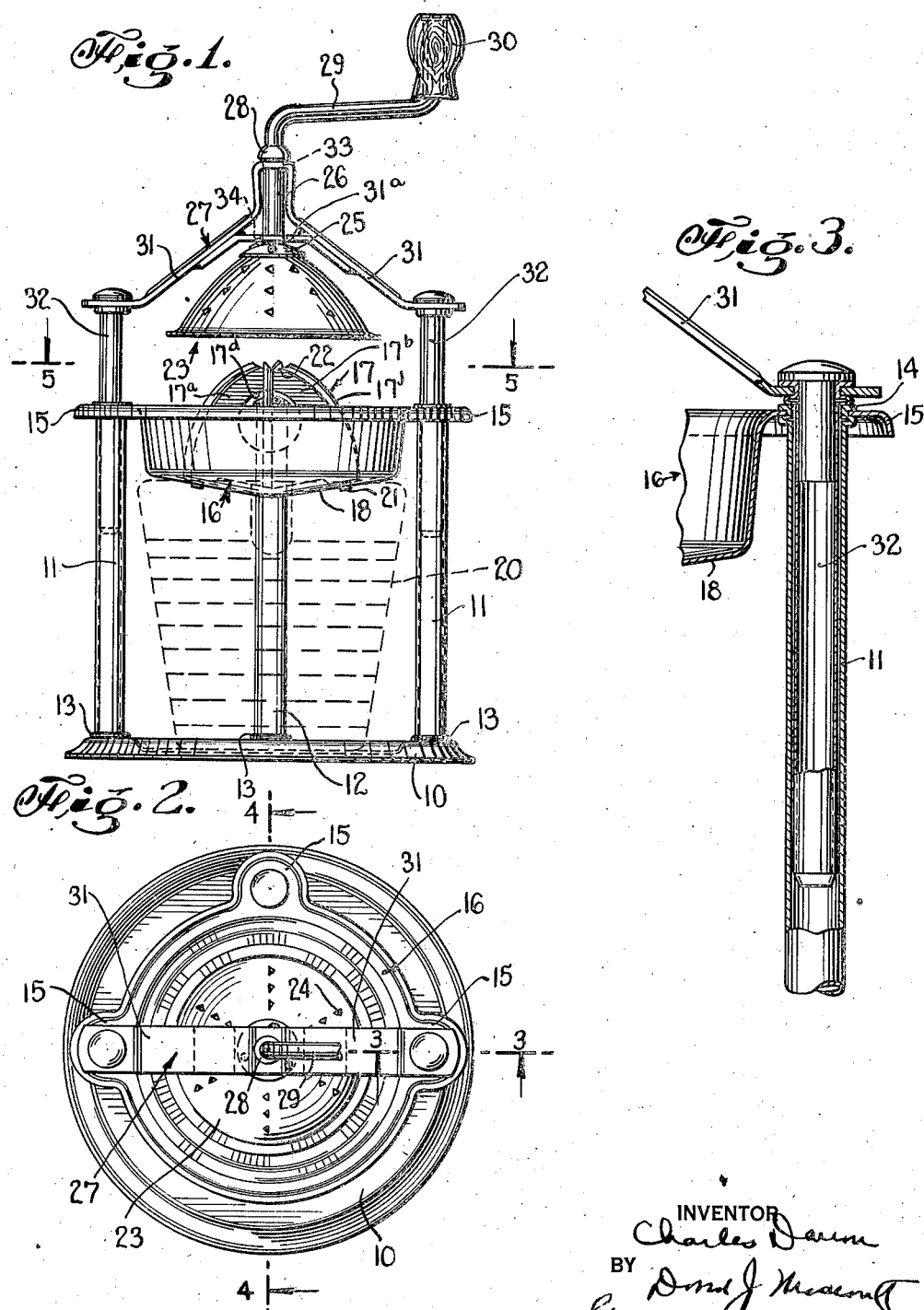

May 25, 1937.  C. DAUM  2,081,424
FRUIT JUICE EXTRACTOR
Filed Oct. 27, 1933  2 Sheets-Sheet 2
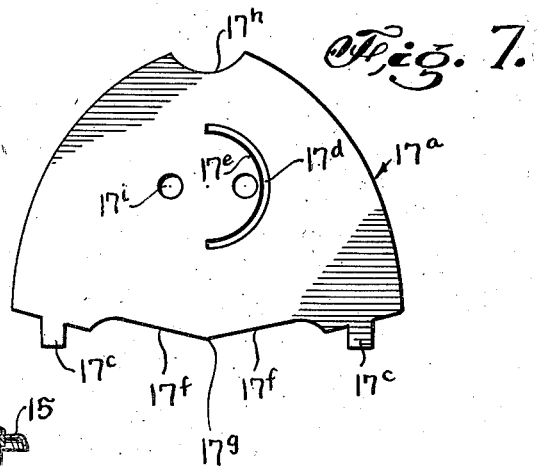
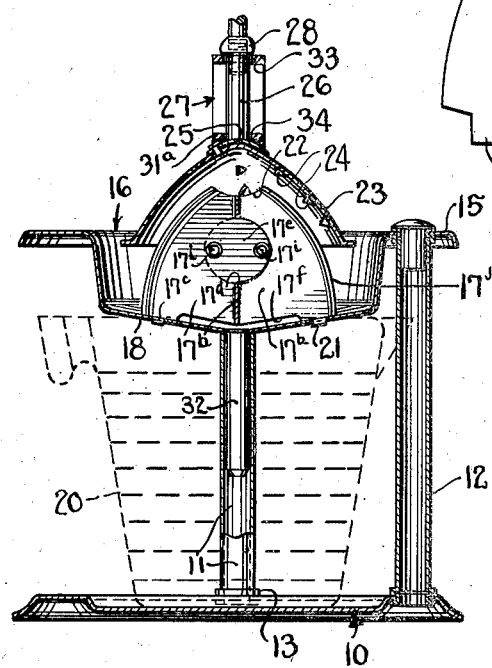
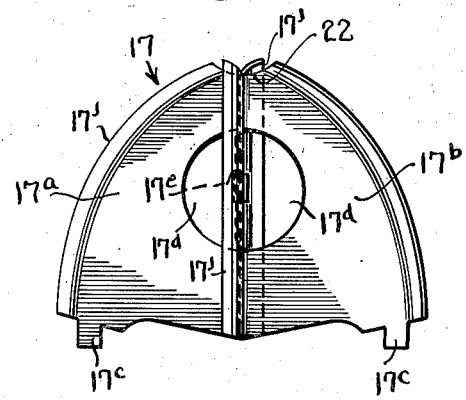
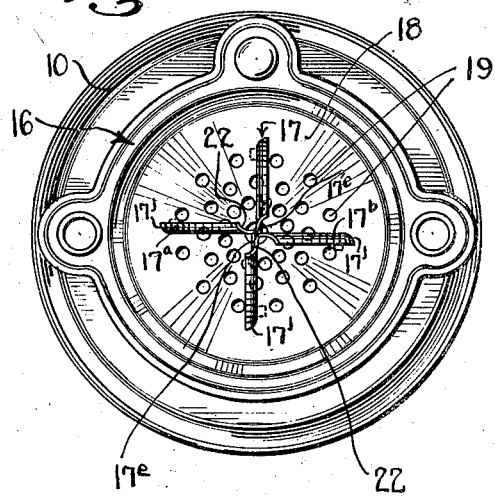
INVENTOR
Charles Daum
BY
ATTORNEY Patented May 25, 1937

2,081,424

UNITED STATES PATENT OFFICE 2,081,424

FRUIT JUICE EXTRACTOR

Charles Daum, Forest Hills, N. Y.

Application October 27, 1933, Serial No. 695,474

1 Claim. (Cl. 146—3)

This invention relates to improvements in fruit juice extractors.

Broadly, it is an object of this invention to provide a novel form of juice extractor incorporating a reamer formed of stamped metal and shaped as to simultaneously tear and crush the cells of fruit from which juice is being extracted and separate or cut away the core of such fruit.

Still further, it is an object of this invention to provide for a fruit juice extractor in which the fruit carrier is vertically reciprocated with respect to the reamer, and in which the reamer is formed of a series of radially disposed extracting elements having a segmental formation, the edges of the respective extracting elements being turned in the same peripheral path, and carried in a cup from which the fruit juices as extracted may be strained and delivered by gravity into a removable receptacle.

Still further, it is an object of this invention to provide for a fruit juice extractor assembly incorporating a self-supporting reamer assembly from which fruit juices may be strained into a receptacle and with which there cooperates a reciprocating fruit-carrying element, the reamer and the cup carrying the same being formed of stamped metal and rigidly fixed one with respect to the other.

Still further, it is an object of this invention to provide a novel form of reamer comprising a series of plates of segmental formation radially disposed with respect to one another and so curved at the extremities thereof as to provide a series of blade edges in the same peripheral path, and so cut out at their upper extremities as to provide a core cutter, whereby the cells of fruit from which juice is to be extracted may be macerated and the macerated portions permitted to separate from the rind of the fruit, thereby to permit the extraction of maximum amount of juice from the fruit with the minimum of pressure and resistance.

These and other advantages, capabilities and features of the invention will appear from the subjoined detailed description of one specific embodiment thereof illustrated in the accompanying drawings, in which Figure 1 is a front elevation of the juice extractor.

Figure 2 is a plan view of the extractor with part of the handle removed.

Figure 3 is a front elevation in section taken along lines 3—3 of Figure 2.

Figure 4 is an end elevation in section taken along lines 4—4 of Figure 2.

Figure 5 is a plan view of the base of the device, including the reamer.

Figure 6 is a front elevation of the reamer element.

Figure 7 is a front elevation of one of the elements forming the reamer before assembly.

Referring to the reference characters in the drawings, numeral 10 represents the base of the juice extractor upon which base there are disposed in spaced relationship three hollow pillars or supports, of which 11 represents the diametrically oppositely disposed guide pillars in which the fruit carrier reciprocates, and 12 represents a support pillar.

The pillars are headed as at 13 to the base and have neck portions 14 in their upper extremity upon which neck portions are disposed ears 15 of the dished cup or receptacle 16, in which is carried reamer 17, the construction and operation of which last two members will be later described. The pillars are headed above the neck portion, so as to fixedly dispose the cup 16 in spaced relationship with respect to the base.

The cup 16 is dished and has a substantially convex base 18, in which is formed a series of apertures 19, through which juice of fruit being extracted may pass into a bowl 20. The impaling member carried in the cup comprises two stamped metal members 17a and 17b, each normally shaped in flat form as indicated in Figure 7. Each member 17a or 17b is provided with a plurality of depending lugs 17c for attaching the same to the cup 16, and a semi-circular cut-out 17d, whereby to permit a portion 17e of the plate adjacent the center line thereof to be bent right-angularly for a purpose to be later described. The base of each plate is shaped to form a plurality of sloping surfaces 17f merging in the apex 17g and the upper portion of each plate 17 is cut out to form a semi-circular surface 17h (see Figure 7).

In assembly each plate is bent around its center line with the half of the plate containing the curvilinear slot 17d being bent right-angularly with respect to the other half of the plate and the portion 17e of the plate defined by the slot 17d extending in the same direction as the unbent portion of the plate. The two plate members thus right-angularly bent are disposed adjacent one another to form a cross (see Figure 5) and the portions 17e of each plate are adapted to be disposed against the uncut side of the other plate, such portion 17e of the plate members being fixed to one another and the plate members thereby being fixed to one another in the cross formation by eye-letting the portion 17e at apertures 17i. The blade edges of each of the plate members as bent are then further bent as at 17j in a curvilinear formation substantially right-angularly to the direction of the plates, all the blade edges of the respective plate members being directed in the same direction and in the same peripheral path (see Figure 5). The projections or lugs 17c at the base of the plate members are passed through slots in the base of the cup 16 and are headed under the base as at 21 thereof, thereby to firmly fix the reamer to the cup. The cut-out portion 17h at the top of each plate upon bending of the plates and the edges thereof assumes a substantially S-shaped formation 22, so as to form a cutting surface to act on the core of the fruit from which juice is to be extracted.

The impaling member 23 comprises a cup-shaped element having punched out interior thereof in radial spaced relationship, gripper members 24, and is carried as by riveting at its center by a hemispherical cup 25 of the shaft member 26. Shaft 26 is carried for rotation on yoke member 27 and has a collar 28 to limit the displacement thereof, the free end of the shaft being bent right-angularly as at 29 to carry handle 30, so that the impaling member may, upon actuation of the handle, be caused to rotate. The yoke 27 has a plurality of integral arms 31 and has a cross-bar 31a welded thereto, there being apertures 33 and 34 in the respective yoke and cross-bar to provide passageway for the shaft, the surface of the yoke and cross-bar adjacent the apertures serving as a bar for the shaft. At the extremities of each of the arms 31 there is disposed as by heading legs 32 extending downwardly and right-angularly from the arms, the said legs being adapted to be disposed within and reciprocated within hollow pillars 11.

In operation the yoke carrying the impaling member may be separated from the remainder of the apparatus by withdrawing the legs 32 thereof out of the hollow pillars 11, so that a half of orange or the like may be disposed in the impaling member, and caused to be carried by the prongs thereof, or the impaling member may be lifted to a sufficient height above the reamer with the legs 32 of the yoke still remaining in the hollow pillars 11 and the half orange or the like disposed in the reamer by impaling the same. The impaling member carrying the half orange or the like is then lowered by permitting the legs of the yoke to slide downwardly in the hollow pillars until the cut surface of the orange or the like rests on the upper portion of the reamer. Then by pressing on the yoke and rotating the impaling member by actuating the handle 30 the interior of the cut orange or the like is caused to be macerated against the bent edges of the plate members and the center or core portion of the orange or the like is adapted to be cut out by the sharp S-formation 22 of the reamer. As further pressure is applied in downward direction to the yoke and the impaling member carrying the cut orange or the like rotated, the cells of the fruit are broken and the juice separated therefrom, the juice falling into the cup 18 and then passing through the apertures 19 thereof into the bowl 20 disposed thereunder.

It is obvious that various changes and modifications may be made to the details of construction without departing from the general spirit of the invention as set forth in the appended claim:

I claim:

A reamer for fruit juice extractors, comprising a plurality of radially disposed sheet metal blades, the outer vertical cutting edge portion of each blade being of arcuate formation and bent laterally, the laterally disposed edge portions of all of the blades being directed in the same direction, the top of each blade being cut away to form an arcuate cutting edge that is disposed in angular relation to the vertical cutting edge portion.

CHARLES DAUM.